UNITED STATES PATENT OFFICE.

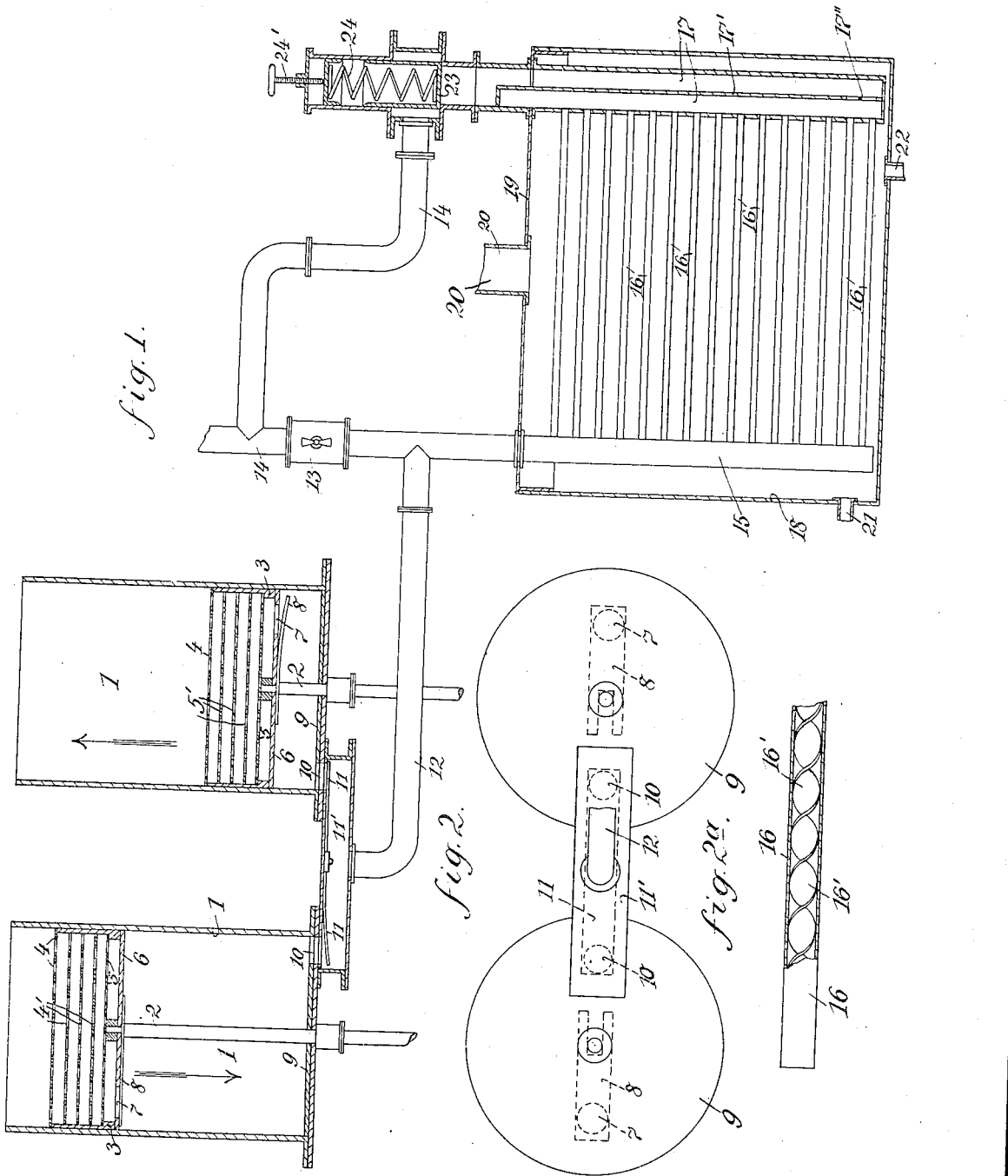

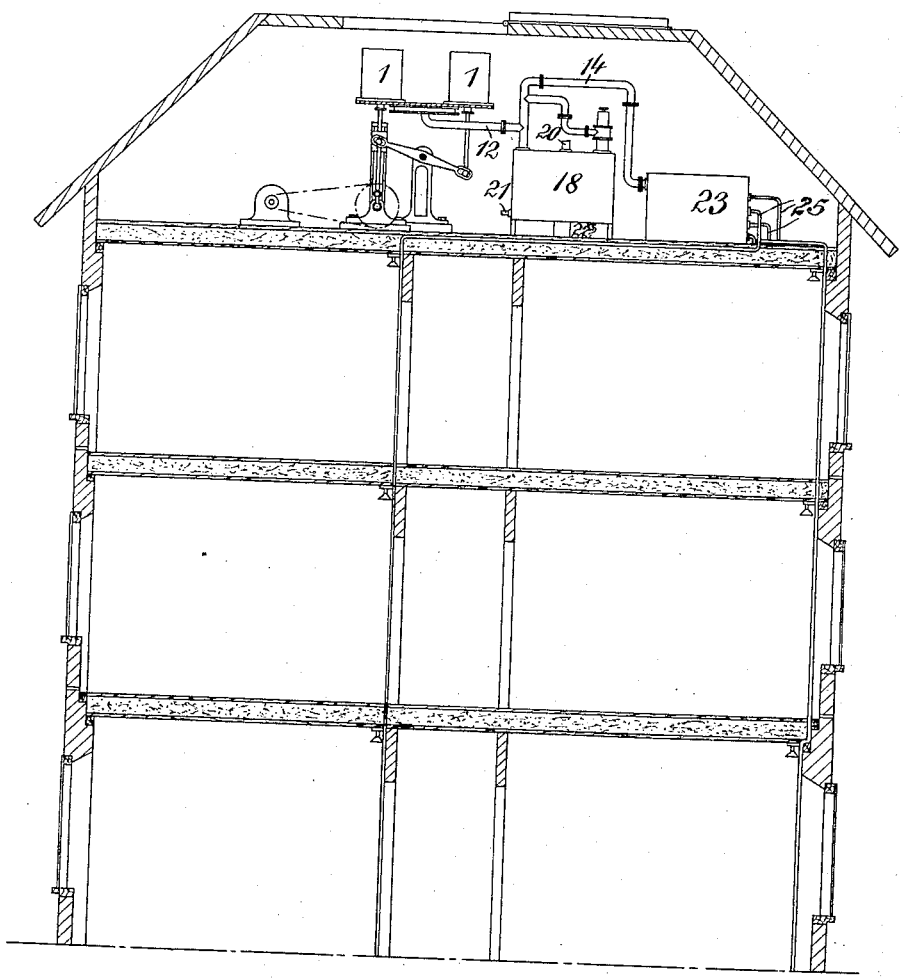

FREDERIK ARNOLD HOLLEMAN, OF THE HAGUE, NETHERLANDS.

VENTILATING PLANT.

No. 925,186.  Specification of Letters Patent.  Patented June 15, 1909.

Application filed March 6, 1908. Serial No. 419,508.

*To all whom it may concern:*

Be it known that I, FREDERIK ARNOLD HOLLEMAN, gentleman, a subject of the Queen of the Netherlands, residing at The Hague, Netherlands, have invented new and useful Improvements in Ventilating Plants, of which the following is a specification.

This invention relates to an apparatus for separating dust and other impurities from air which is to be respired by means of a filtering material.

In the accompanying drawings Figure 1 is a side elevation partly in section of an air filter for the ventilation of schools, hospitals, offices, theaters, halls etc., with purified air. Fig. 2 is an underside view of certain parts of Fig. 1. Fig. 2ª shows a detail to be hereinafter referred to. Fig. 3 represents a sectional elevation showing my novel construction of ventilating plant in a house.

The outside air is forced into the building to be ventilated by means of a motor or the like and by means of the pump cylinders 1. The pistons 2 of these cylinders form boxes 3, in which the filtering material is loosely packed between perforated plates 4, 5, intermediate of which are partitions $4^1$, $5^1$, of wire gauze, which prevent the material from balling. The bottoms 6 of the pistons 2 have openings 7, closed by spring valves 8. The bottoms 9 of the cylinders 1 are also provided with openings 10, closed by spring valves 11. On a piston 2 moving upward, the valve 11 closes the aperture 10 while the valve 8 opens and exposes the aperture 7, so that the outside air can enter through this aperture 7 and fill the space below the piston 2. The air in entering passes through the filtering material in the box 3 and is thus purified.

When the piston 2 descends the valve 8 is closed and the valve 11 opens. The purified air in the cylinder, below the piston, is now forced into the chamber $11^1$ and thence into the pipe 12. From the latter it flows through the valve 13 and enters the pipe 14, which leads to a reservoir 23, insulated by means of cork sheeting, located at the top or other part of the building. This reservoir 23 is provided with as many openings 25 as there are rooms to be ventilated. From each of these openings a separate pipe 24 leads to the ceiling of the room in question, from where the purified air is dispersed in various directions, so that the room is filled with pure air from above, while the vitiated exhaled air escapes through numerous openings near the floor to the open air. The width of the openings in the air reservoir, through which the purified air is driven to the different rooms, will depend upon the size of the latter. In this manner any desired room can be supplied with as much purified air as may be required.

Should the weather render it desirable, the purified air with which the rooms are ventilated can be warmed or cooled by means of apparatus which I will now describe.

From the pipe 13 there branches a system of pipes 15, 16, 17 through which the purified air, coming from the pipe 12, is forced before it enters the pipe 14 leading to the reservoir. These pipes 15, 16, 17 may be of red copper and be arranged in a wooden box 18, insulated by means of sheets of cork or the like, and furnished with a cover 19. The box has an opening 21 near the bottom and an outlet 22 in the latter; there is also an outlet pipe 20 provided on the cover. If the purified air is to be warmed, the valve 13 is closed and steam or hot vapor from the motor is conducted through the opening 21 in the box 18, warming the pipes 15, 16, 17. The pipes 16 are furnished internally with screw-shaped thin metal plates $16^1$ (Fig. 2ª) so that the air forced into them is compelled to flow along their walls, whereby it is exposed to the heat for a considerable length of time. The pipe 17 is divided into two parts by a plate 17', which has at its lower end an opening 17'' through which the warmed air passes from the one part of this pipe to the other, so that the air coming from the pipes 16 has to flow over the same distance in the heated pipes and through the opened valve in reservoir 23 before reaching the pipe 14.

When the weather is hot, the purified air can be cooled by means of the same apparatus. The valve 13 remains closed, while the valve 23 opens, but only under increased pressure of the air, since this valve then hinders the outflow of air from the pipe 17 to the pipe 14, being kept closed by a spring 24. While the temperature of the air is being raised by the pressure, the pipes 15, 16, 17 are cooled by cold air blown into the box 18, through the opening 21, by means of a ventilator.

Supposing the temperature of the outside air is 25° C. and the pressure of the air in the pipes 15, 16, 17 is increased by ¼ atmosphere, the temperature of the air in these pipes is then 43° C. If this air is now cooled from 43° to 35° by the cold air blown in, the compressed air escaping from the pipe 17 into the pipe 14 will have a temperature of 17° C. By means of a screw 24' the pressure of the air in the pipes 15, 16, 17 and thus also its temperature on entering the pipe 14 can be increased or diminished as desired. Cooling of the air to be purified can be promoted by the aid of a jet of water. On heating the pipes 15, 16, 17 by means of steam, the latter will be condensed and the water thus formed can be drained off through the exit 22.

The apparatus here described and drawn to a scale of $\frac{1}{20}$ full size, is designed to ventilate a building in which 1000 persons could assemble, assuming that each person inhales about 16 liters of air per minute.

Having thus described my invention, what I claim as new and desire to secure by Letters Patent is:—

1. A ventilating plant, comprising an air pump, consisting of a cylinder and a hollow piston working therein and packed with a filtering material and having a perforated front wall and a valved back wall, and an air reservoir communicating with the cylinder, and distributing pipes conducting from the reservoir, substantially as described.

2. A ventilating plant, comprising an air pump, consisting of a cylinder and a hollow piston working therein and packed with a filtering material and having a perforated front wall and a valved back wall, an assemblage of pipes communicating with the cylinder, a receptacle containing said pipes, means for heating or cooling the pipes, and means for distributing the filtered air, substantially as described.

3. A ventilating plant, comprising an air pump, consisting of a cylinder and a hollow piston working therein and packed with a filtering material and having a perforated front wall and a valved back wall, an assemblage of pipes communicating with the cylinder, a spring actuated outlet valve for regulating the pressure in the pipes, a receptacle containing said pipes and having a cold air inlet, and means for distributing the filtered air, substantially as described.

4. A ventilating plant, comprising an air pump, consisting of a cylinder and a hollow piston working therein, and packed with a filtering material and having a perforated front wall and a valved back wall, an assemblage of pipes communicating with the cylinder and presenting internal spiral plates, whereby the air is compelled to flow along their walls, a receptacle containing said pipes, means for heating or cooling the pipes, and means for distributing the filtered air, substantially as described.

5. A ventilating plant, comprising an air pump, consisting of a cylinder and a hollow piston working therein and packed with a filtering material and having a perforated front wall and a valved back wall, an assemblage of pipes communicating with the cylinder, a collecting pipe into which said pipes conduct presenting two chambers communicating only below, a receptacle containing the pipes, means for heating or cooling them, and means for distributing the filtered air, substantially as described.

In witness whereof I have hereunto signed my name this 20th day of February 1908, in the presence of two subscribing witnesses.

FREDERIK ARNOLD HOLLEMAN.

Witnesses:
MARION SCHAEBÜE,
L. KOOT.